United States Patent [19]
Zsifkovits

[11] Patent Number: 4,878,935
[45] Date of Patent: Nov. 7, 1989

[54] SUPPORTING MECHANISM FOR MOULD SIDE PORTIONS IN A GLASSWARE FORMING MACHINE

[75] Inventor: Johann Zsifkovits, Forch, Switzerland

[73] Assignee: Emhart Industries Inc., Farmington, Conn.

[21] Appl. No.: 280,769

[22] Filed: Dec. 6, 1988

[30] Foreign Application Priority Data

Dec. 29, 1987 [GB] United Kingdom ............... 8730248

[51] Int. Cl.⁴ ............................................. C03B 9/353
[52] U.S. Cl. ..................................... 65/323; 65/361
[58] Field of Search ................. 65/323, 357, 359–361; 425/450.1, 451, 453

[56] References Cited

U.S. PATENT DOCUMENTS

| | | | |
|---|---|---|---|
| 3,268,322 | 8/1966 | Denman | 65/360 |
| 3,278,290 | 10/1966 | Rowe | 65/360 |
| 3,967,946 | 7/1976 | Campbell | 65/359 |
| 4,101,306 | 7/1978 | Schaar | 65/323 |

Primary Examiner—Joye Woodard
Attorney, Agent, or Firm—Spencer T. Smith

[57] ABSTRACT

The mechanism supports mould side portions (10;110) on an upper support (50;150) and a lower support (52;152) both mounted on an arm (14) for limited movement in a horizontal plane. A force apportioning member (62;162) is mounted on the arm and pivotally engages both supports. The force apportioning member (62;162) pivots on a horizontal axis between the supports to apportion mould closure force between the supports. The pivots may be provided by spherical bearings (64,70;164;170).

2 Claims, 2 Drawing Sheets

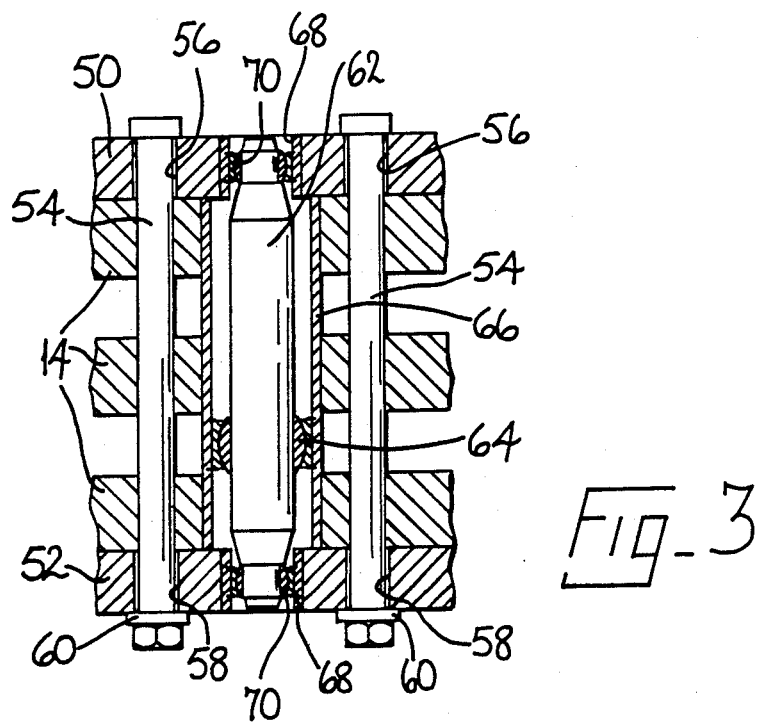
Fig_3
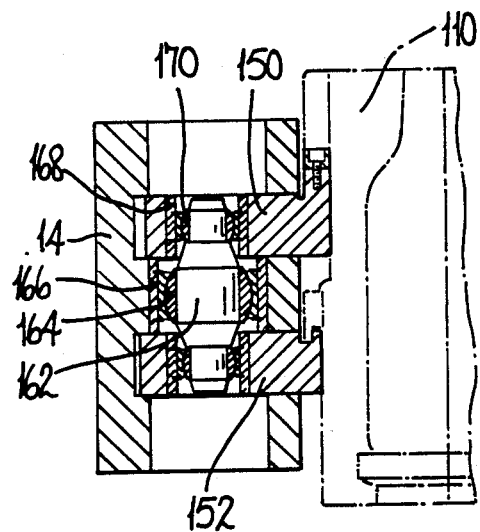
Fig_4

SUPPORTING MECHANISM FOR MOULD SIDE PORTIONS IN A GLASSWARE FORMING MACHINE

BACKGROUND OF THE INVENTION

This invention is concerned with a supporting mechanism for supporting mould side portions in a glassware forming machine, e.g. of the individual section type.

In glassware forming machines of the individual section type, the supporting mechanisms for the mould side portions comprise two arms each arranged, on the application of a mould closure force thereto, to move in predetermined directions from mould open positions thereof to mould closed positions thereof and to remain in the mould closed positions during a moulding operation of the machine. In some machines of the individual section type, the arms move towards one another arcuately about a common vertical axis to reach their mould closed positions whereas in other machines he arms move linearly towards one another. In the mould closed position, one or more mould side portions (there may be as many as four) supported on each arm cooperate with mould side portions supported on the other arm to define mould cavities in which molten glass can be moulded. On the application of a mould opening force, the arms return to their mould open positions, by moving in the opposite direction to said predetermined direction. In their mould open positions, the mould side portions supported on each arm are separated from those supported on the other arm to allow removal of moulded glass. Such supporting mechanisms are used both for "blank" moulds for moulding gobs of molten glass into parisons, by a pressing or a blowing operation, and also for "finish" moulds for moulding parisons into completed articles of glassware.

Conventionally, the supporting mechanisms comprise an upper and a lower support mounted on each arm. The upper and lower support on an arm cooperate in supporting said one or more mould side portions. The supports are generally mounted on the arm for limited pivoting movement and each defines a recess into which a hook-shaped projection of the mould side portion extends so that the mould side portion hangs on the supports. Normally, a mould side portion rests on the upper support while the lower support prevents the mould side portion from pivoting relative to the upper support.

In conventional supporting mechanisms, problems can arise due to poor distribution of the mould closure force between the upper and lower supports so that one support may apply excessive or insufficient force to part of the mould side portion. This can result in the formation of pronounced seams on the parison or bottle. In the case of bottles with long necks and a large body diameter, the lower part of mould is often forced further open by the air pressure used to mould the glass. In the case of the blank moulds in a narrow neck press and blow operation, the lower part of the mould also tends to be forced open by the plunger used for the pressing operation. Suggestions for alleviating these problems are described in U.S. Pat. Nos. 3,967,946 and 4,101,306. In U.S. Pat. No. 3,967,946, a supporting mechanism is described which incorporates a hydraulic system having two pistons pressing against the mould side portion, one against an upper part and the other against a lower part. The cylinders in which the pistons move are interconnected by a pipe containing hydraulic fluid so that, when the one piston is pressed inwardly by the mould side portion, the other piston exerts pressure thereon. This mechanism is relatively complex and is not, as far as is known, is use. In U.S. Pat. No. 4,101,306, a supporting mechanism is described in which the upper and lower supports are integral and can tilt about a horizontal axis. The lower support is also unconventional in that it has a projection extending downwardly into a recess in the mould side portion, thus making mould changing move complex. This mechanism is also relatively complex and would lead to variations in the height of the mould as the supports pivoted.

It is an object of the present invention to provide a supporting mechanism of the type referred to in which the aforementioned problems are avoided and which avoids the disadvantages of the aforementioned suggestions.

SUMMARY OF THE INVENTION

The invention provides a supporting mechanism for supporting mould side portions in a glassware forming machine, the mechanism comprising an arm arranged, on the application of a mould closure force thereto, to move in a predetermined direction from a mould open position thereof to a mould closed position thereof and to remain in the mould closed position during a moulding operation of the machine, and, on the application of a mould opening force thereto, to return to the mould open position, in which mechanism, in the mould closed position, one or more mould side portions supported by the mechanism cooperate with other mould side portions to define one or more mould cavities in which molten glass can be moulded and, in the mould open position, the mould side portions are separated from said other mould portions to allow removal of moulded glass, the mechanism also comprising an upper support and a lower support mounted on the arm to cooperate in supporting said one or more mould side portions, wherein the upper and lower supports are each mounted on the arm for limited movement in a horizontal plane, and the mechanism also comprises at least one force apportioning member mounted on the arm to pivot about a horizontal axis between the upper and the lower supports and extending normal to said predetermined direction and pivotally connected to the upper and lower supports by which, when the arm is in the mould closed position, the mould closure force is apportioned between the upper and lower supports.

In a supporting mechanism according to the last preceding paragraph, the mould closure force is apportioned between the upper and lower supports by an arrangement which is relatively simple and which maintains the mould side portion at a constant height.

The apportioning member may be mounted on the arm on a spherical bearing. The apportioning member may also be connected to the upper and lower supports by spherical bearings.

The height of the horizontal axis may be arranged to suit the shape of the particular mould cavity involved. For example, for a short cavity, the horizontal axis may be substantially equi-distant from said upper and lower supports whereas, for a longer cavity, the horizontal axis may be nearer to said lower support than to said upper support.

BRIEF DESCRIPTION OF THE DRAWINGS

There now follows a detailed description, to be read with reference to the accompanying drawings, of two supporting mechanisms which are illustrative of the invention. It is to be understood that the illustrative supporting mechanisms have been selected for description by way of example and not of limitation of the invention.

In the drawings:

FIG. 3 is a cross-sectional view taken on the line III—III in FIG. 1; and

FIG. 4 is a cross-sectional view similar to the left hand side of FIG. 2 but taken through the second illustrative supporting mechanism.

DETAILED DESCRIPTION

Figure 1:
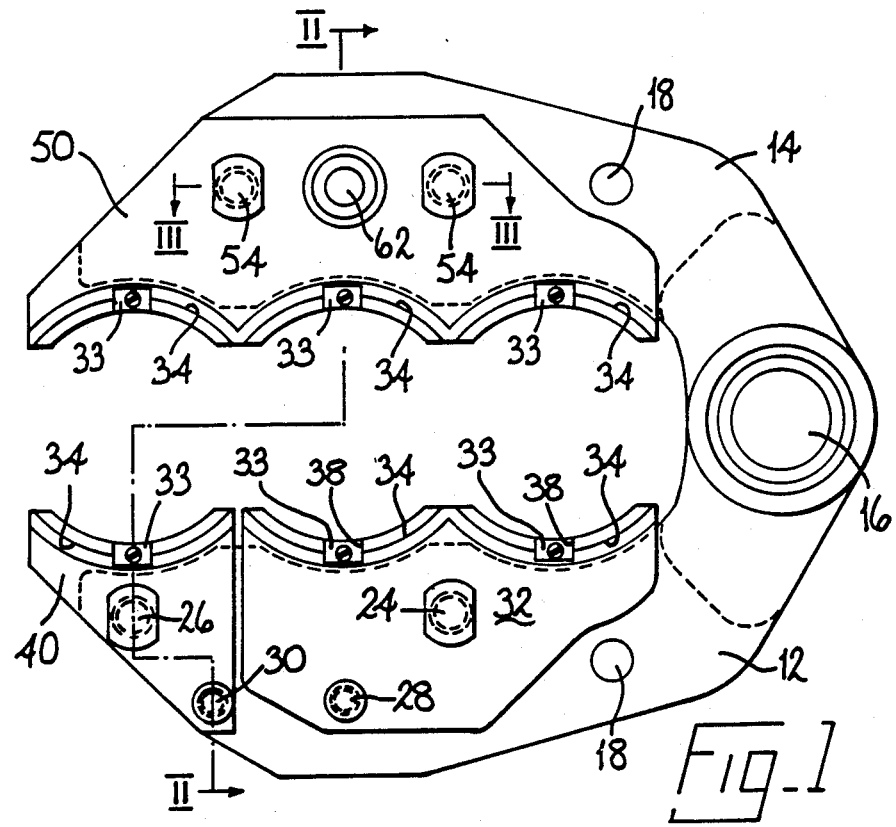
FIG. 1 is a plan view of the first illustrative supporting mechanism.
Figure 2:
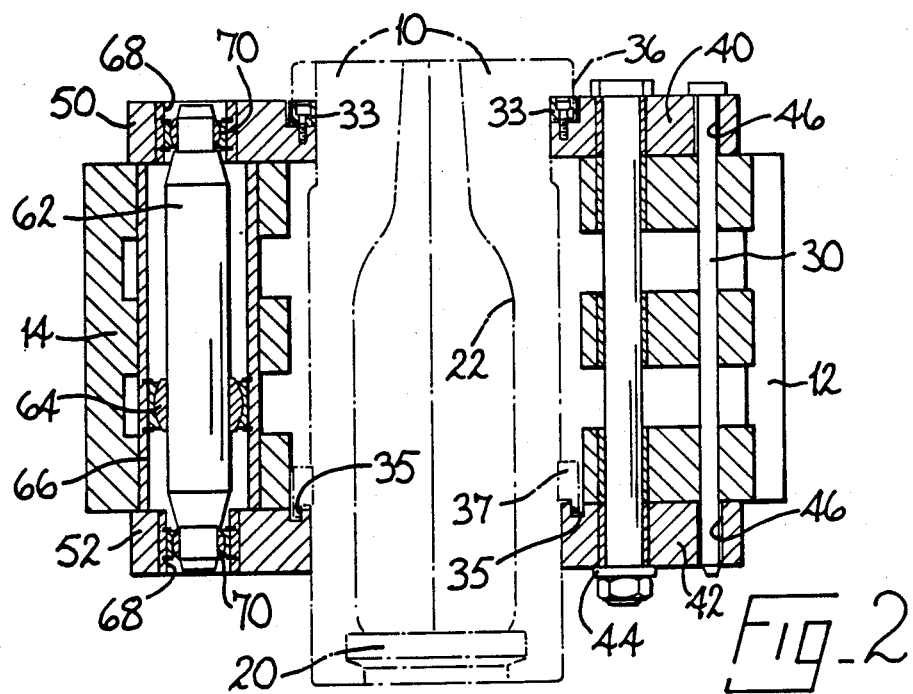
FIG. 2 is a cross-sectional view taken on the line II—II in FIG. 1.

The first illustrative supporting mechanism shown in FIGS. 1 to 3 is for supporting finish mould side portions 10 (which have been omitted from FIG. 1) in a glassware forming machine of the individual section type. The mechanism is arranged to support the side portions 10 of three moulds but modifications of the first illustrative supporting mechanism may support side portions of one, two or four moulds or blank moulds instead of finish moulds. The mechanism comprises two arms 12 and 14 which are mounted, in conventional manner, on a common vertical pivot pin 16. A mould opening and closing mechanism (not shown) of conventional construction is provided for applying a mould closure force or a mould opening force to the arms 12 and 14, the forces being applied via links (not shown) pivotally connected to the arms 12 and 14 by pins 18 mounted on the arms.

On the application of a mould closure force thereto, the arms 12 and 14 are arranged to move in predetermined directions arcuately about the pin 16 from mould open positions thereof (not shown) to mould closed positions thereof (shown in FIG. 1). The arms 12 and 14 approach one another with the arm 12 moving clockwise and the arm 14 moving anti-clockwise. The arms 12 and 14 are arranged to remain in their mould closed positions during a moulding operation of the machine, being held there by continued application of the mould closure force.

On the application of a mould opening force thereto, the arms 12 and 14 are arranged to return to their mould open positions by reversing their arcuate movements about the pin 16.

In the mould closed positions of the arms 12 and 14, the mould side portions 10 supported by each arm cooperate with mould side portions supported by the other arm and with bottom plates 20 to define mould cavities 22 in which molten glass can be moulded. In the mould open positions of the arms 12 and 14 (not shown), the mould side portions 10 supported by the arm 12 are separated from those supported by the arm 14 to allow removal of moulded glass.

The arms 12 and 14 are of different construction, the arm 12 being of conventional construction whereas the arm 14 embodies the novel features of the present invention. Both arms 12 and 14, however, are formed as three horizontally-extending plates interconnected by vertical bracing members (see FIG. 2).

The arm 12 supports two vertically-extending pivot pins 24 and 26 and two pivot limiting pins 28 and 30. Pivotally mounted on the pin 24 on top of the arm 12 is an upper double support 32 which cooperates with a lower double support (not shown) also pivotally mounted on the pin 24 but mounted beneath the arm 12, being supported by a washer mounted on the pin 24. The two double supports are arranged to cooperate in supporting two mould side portions 10 and, to this end, the upper double support has two arcuate slots 34 in an upper surface thereof into which depending portions of hook-shaped projections 36 of the mould side portions 10 extend to mount the portions 10 on the supports. The upper slots 34 each have a gap 38 therein in which a location block 33 is mounted over which a slot in the projection 36 of the mould side portion 10 fits to prevent the hook-shaped portions 36 from moving along the slots 34. The lower double support plate (not shown) has two short straight slots 35 into which lower hook-shaped projections 37 of the side portions 10 fit to prevent the side portions 10 from tilting (the slots 35 of the double support are not visible in the drawings but are identical to those shown in FIG. 2). The pivot limiting pin 28 projects into clearance holes (not shown) in both the double supports to limit the pivoting thereof about the pin 24 which is disposed on a line passing centrally between the two mould side portions 10. The double supports can pivot about the pin 24 to equalise the mould closure force between the two mould side portions 10 supported thereby.

Pivotally mounted on the pin 26 are an upper single support 40 on top of the arm 12 and a lower single support 42 beneath the arm 12 and supported by a washer 44 on the pin 26. The single supports 40 and 42 are arranged to cooperate in supporting a mould side portion 10 and, to this end, the upper support 40 is provided with an arcuate slot 34 into which a depending portion of the hook-shaped projection 36 of the mould side portion 10 extends. A location block 33 is also provided. The lower plate is provided with a slot 35 to receive a lower hook portion 37 of the mould side portion 10. The pivot limiting pin 30 projects into clearance holes 46 in both the single supports 40 and 42 to limit the pivoting thereof about the pin 26 which is disposed centrally of the mould side portion 10 supported by the supports 40 and 42. The single supports 40 and 42 can pivot about the pin 26 to equalise the mould closure force across the mould side portion 10 supported thereby.

The first illustrative mechanism also comprises an upper triple support 50 and a lower triple support 52 which are mounted on the arm 14 to cooperate in supporting three mould side portions 10 two of which cooperate with the mould side portions 10 on the double supports 32 and one of which cooperates with the mould side portion 10 on the single support 40 and 42 in defining mould cavities 22. The upper support 50 is mounted on top of the arm 14 for limited movement in a horizontal plane, the movement being limited by two vertically-extending pins 54 supported by the arm 14 which pass through clearance holes 56 in the support 50 and have heads which retain the support 50 on the arm 14. The upper support plate 50 has three slots 34 and location blocks 33.

The lower support 52 is mounted beneath the arm 14 for limited movement in a horizontal plane, the movement being limited by the pins 54 which pass through clearance holes 58 in the support 52 and have washers 60 thereon which retain the support 52 on the arm 14. The support 52 is provided with three slots 35.

The first illustrative mechanism also comprises a force apportioning member 62 arranged, when the arm 14 is in its mould closed position, to apportion the mould closure force between said upper support 50 and said lower support 52. The force apportioning member 62 is in the form of a cylindrical rod with turned-down ends. The apportioning member 62 is mounted on the arm 14 to pivot about a horizontal axis between the upper support 50 and the lower support 52, the axis extending normal to the predetermined direction in which the arm 14 moves to its mould closed position. Specifically, the apportioning member 62 is mounted on a spherical bearing 64 supported within a vertically-extending tube 66 set into the arm 14. The apportioning member 62 is also pivotally connected to the upper support 50 and to the lower support 52. Vertically-extending tubes 68 are set into the supports 50 and 52 and support spherical bearings 70 which engage the turned-down ends of the apportioning member 62. The supports 50 and 52 can pivot about the bearings 70 to an extent limited by the clearance holes 56.

During a moulding operation, the apportioning member 62 pivots to apportion the mould closure force between the upper and the lower supports 50 and 52. In this case, the lower support 52 requires more force than the upper support 50 so the horizontal axis is provided nearer to the lower support 52 than to the upper support 50. The exact height of the axis is predetermined and the height of the spherical bearing 64 in the tube 66 is adjusted accordingly. As the member 62 pivots, the supports 50 and 52 "float" in the aforementioned horizontal planes.

In the first illustrative supporting mechanism, the height of each support 50 and 52 remains constant, being defined by the height of the arm 14.

The spherical bearing 64 of the first illustrative supporting mechanism is approximately twice as far from the support 50 as it is from the support 52. Because the mould cavity 22 illustrated in FIG. 2 has a greater surface area in the vicinity of the lower support 52 than in the vicinity of the upper support 50, the support 52 is expected to experience the greater force, in this case, approximately double that experienced by the support 50.

The height selected for the spherical bearing 64 depends not only on the size and shape of the mould cavity 22 but also on the heights of the supports 50 and 52, it being conventional to mount supports not only on top of or beneath arms but also in the gaps between the aforementioned horizontal plates of the arm. The optimum height can be determined by calculation or experiment.

The second illustrative supporting mechanism shown in FIG. 4 is identical to the first illustrative mechanism except that the arm 14 has an upper support 150 and a lower support 152 mounted between the horizontal plates of the arm. The supports 150 and 152 cooperate in supporting a mould side portion 110. The supports 150 and 152 are generally similar to the supports 50 and 52 and can float in a horizontal plane. They have tubes 168 set into them which support spherical bearings 170 engaged by turned down ends of a force apportioning member 162. The force apportioning member 162 is considerably shorter than the member 62 and is mounted on a spherical bearing 164 supported by a vertically-extended tube 166 set into the central horizontal plate of the arm 14. The horizontal axis on which the apportioning member 162 pivots is mid-way between the supports 150 and 152 so that the mould closure force is apportioned equally between the supports.

I claim:

1. An individual section glassware forming machine for carrying out glassware forming processes in a mold or molds comprising a plurality of opposing mold supporting portions which when clamped together form at least one mold having a vertical axis, each of said mold supporting portion including
   a top plate including a mold engaging portion which is to be proximate an upper portion of a mold,
   a bottom plate including a mold engaging portion which is to be proximate a lower portion of a mold, and
   a body portion extending between said top and bottom plates,
   means for mounting said top and bottom plates for rotational displacement about a vertical axis so that each of said plates can rotate to bring its mold engaging portion into engagement with a mold including
   vertical shaft means,
   means for mounting said vertical shaft means in said body portion for pivotal displacement about a horizontal axis, and
   bearing means for pivotally interconnecting said top and bottom plates to opposing ends of said vertical shaft means, whereby
   one of said plates can be displaced toward a mold while the other of said plates will be displaced away from a mold so that said plates can automatically compensate for a mold axis which is not precisely vertically oriented.

2. A machine according to claim 1, wherein said means for mounting the vertical shaft means comprises
   a sleeve member extending through said body portion and having an inner diameter substantially larger than an outer diameter of said shaft means,
   spherical bearing means, and
   means for mounting said spherical bearing means on said sleeve intermediate said top and bottom plates to support said shaft means.

* * * * *